(12) United States Patent
Kozitsky et al.

(10) Patent No.: US 9,025,865 B2
(45) Date of Patent: May 5, 2015

(54) METHODS AND SYSTEMS FOR REDUCING MEMORY FOOTPRINTS ASSOCIATED WITH CLASSIFIERS

(71) Applicant: Xerox Corporation, Norwalk, CT (US)

(72) Inventors: Vladimir Kozitsky, Rochester, NY (US); Aaron Michael Burry, Ontario, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 148 days.

(21) Appl. No.: 13/746,412

(22) Filed: Jan. 22, 2013

(65) Prior Publication Data

US 2014/0079315 A1 Mar. 20, 2014

Related U.S. Application Data

(60) Provisional application No. 61/700,935, filed on Sep. 14, 2012.

(51) Int. Cl.
| | |
|---|---|
| *G06K 9/62* | (2006.01) |
| *A47C 7/14* | (2006.01) |
| *B60N 2/44* | (2006.01) |
| *B60N 2/02* | (2006.01) |
| *B60N 2/18* | (2006.01) |

(52) U.S. Cl.
CPC . *A47C 7/14* (2013.01); *B60N 2/442* (2013.01); *G06K 9/6267* (2013.01); *B60N 2/02* (2013.01); *B60N 2/1803* (2013.01); *B60N 2/1835* (2013.01); *B60N 2/1864* (2013.01); *B60N 2002/0236* (2013.01)

(58) Field of Classification Search
None
See application file for complete search history.

(56) References Cited

U.S. PATENT DOCUMENTS

| 2009/0074259 A1* | 3/2009 | Baltatu et al. ................ 382/118 |
| 2011/0184896 A1* | 7/2011 | Guyon ............................ 706/12 |
| 2013/0182910 A1* | 7/2013 | Burry et al. .................... 382/105 |

OTHER PUBLICATIONS

Somashekar et al, "Face Detection by SMQT Features and SNoW Classifier Using Color Information" International Journal of Engineering Science and Technology (IJEST). Feb. 2, 2011. vol. 3(2): 1266-1272.*
Hunyadi et al, "Automatic Seizure Detection Incorporating Structual Information" Artificial Neural Networks and Machine Learning—ICANN 2011 vol. 6791, 2011, pp. 233-240.*
Lai et al, "Random Subspace Method for Multivariate Feature Selection" Pattern Recognition Letters 27, 2006, pp. 1067-1076.*

(Continued)

*Primary Examiner* — Jayesh A Patel
*Assistant Examiner* — Mai Tran
(74) *Attorney, Agent, or Firm* — Kermit D. Lopez; Luis M. Ortiz; Ortiz & Lopez, PLLC (57) ABSTRACT

Methods and systems for reducing the required footprint of SNoW-based classifiers via optimization of classifier features. A compression technique involves two training cycles. The first cycle proceeds normally and the classifier weights from this cycle are used to rank the Successive Mean Quantization Transform (SMQT) features using several criteria. The top N (out of 512 features) are then chosen and the training cycle is repeated using only the top N features. It has been found that OCR accuracy is maintained using only 60 out of 512 features leading to an 88% reduction in RAM utilization at runtime. This coupled with a packing of the weights from doubles to single byte integers added a further 8× reduction in RAM footprint or a reduction of 68× over the baseline SNoW method.

17 Claims, 6 Drawing Sheets

(56) References Cited

OTHER PUBLICATIONS

Xie et al, "Improved Feature Selection Algorithm Based on SVM and Correlation" Advances in Neural Networks—ISNN 2006 vol. 3971, 2006, pp. 1373-1380.*

Mikael Nilsson, Face Detection Using Local SMQT Features and Split Up SNOW Classifier, 2007, IEEE, Blekinge Institute of Technology, pp. 589-592.*

K Somasheka, Face Detection by SMQT Features and SNOW Classifier Using Color Information, Feb. 2011, International Journal of Engineering Science and Technology (IJEST), vol. 3 No. 2, pp. 1266-1272.* http://code.google.com/p/tesseract-ocr/.

Keysers, D. et al., "Deformation Models for Image Recognition," IEEE Transactions on Pattern Analysis and Machine Intelligence (2007) 29(8):1422-1435.

Nilsson, M. et al., "The Successive Mean Quantization Transform," Acoustics, Speech, and Signal Processing, 2005. Proceedings. (ICASSP '05). IEEE International Conference on , vol. 4, No., pp. iv/432 vol. 4, Mar. 18-23.

Nilsson, M. et al., "Face Detection Using Local SMQT Features and Split up SNoW Classifier," Acoustics, Speech and Signal Processing, 2007. ICASSP 2007. IEEE International Conference on , vol. 2, No., pp. II-589-II-592, Apr. 15-20.

Roth, D. et al., "A SNoW-Based Face Detector," The Conference on Advances in Neural Information Processing Systems (NIPS) (2000) pp. 855-861.

\* cited by examiner

METHODS AND SYSTEMS FOR REDUCING MEMORY FOOTPRINTS ASSOCIATED WITH CLASSIFIERS

CROSS-REFERENCE TO PROVISIONAL APPLICATION

This application claims priority under 35 U.S.C. 119(e) to U.S. Provisional Patent Application Ser. No. 61/700,935, entitled "Snout OCR Using Reduced SMQT Features," which was filed on Sep. 14, 2012 the disclosure of which is incorporated herein by reference in its entirety.

FIELD OF THE INVENTION

Embodiments are generally related to data-processing methods and systems and processor-readable media. Embodiments are also related to the field of ALPR (Automated License Plate Recognition) and OCR (Optical Character Recognition).

BACKGROUND

ALPR (Automatic License Plate Recognition) is an image-processing approach that often functions as the core module of "intelligent" transportation infrastructure applications. License plate recognition techniques, such as ALPR, can be employed to identify a vehicle by automatically reading a license plate utilizing image processing and character recognition technologies. A license plate recognition operation can be performed by locating a license plate in an image, segmenting the characters in the captured image of the plate, and performing an OCR (Optical Character Recognition) operation with respect to the characters identified.

In general, an OCR engine can be optimized for performance with respect to a document having a uniform substrate (often the 'paper') with known or unknown characters. The substrate (the 'plate' background) of the license plate, however, is quite non-uniform due to noise with a constrained set of characters and fonts. Hence, the OCR engine optimized for document OCR is not optimum for the license plate OCR. The task of recognizing characters on the license plate is particularly difficult due to a number of challenging noise sources, for example, highly non-uniform backgrounds, touching or partially occluding objects (e.g., license plate frames), excessive shadows, and generally poor image contrast. Such noises present a much more challenging OCR problem than that typically seen in standard document scanning applications.

ALPR is a key technology for many transportation business. A fundamental capability within most ALPR systems is that of OCR. An example of some basic technologies driving OCR engines for license plate optical character recognition is disclosed in U.S. patent application Ser. No. 13/352,554, which was filed on Jan. 18, 2012 and is incorporated herein by reference in its entirety.

A SNoW (Sparse Network of Winnows) classifier based OCR engine using SMQT features have been found to perform better than other state of the art engines such as IDM-NN and Tesseract OCR in terms of accuracy and processing speed. One negative attribute of this OCR approach is the memory footprint required for the classifier. In order to address the problem of individual fonts across different U.S. states, it is typical to train a separate OCR engine that is highly tuned for each font. Unfortunately, as more state fonts are added to the engine, the RAM utilization and size of the resulting classifier on disk grows rapidly. Another customer requirement for an ALPR system is high throughput rates (to keep up with traffic volumes). This is typically handled by launching multiple instances of the ALPR engine, thereby achieving high throughput via parallelization. Unfortunately, this compounds the memory management problems.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved classifier training method and system.

It is another aspect of the disclosed embodiments to provide for methods, systems, and processor-readable media for significantly reducing the required footprint of SNoW classifiers via optimization of the classifier features.

The aforementioned aspects and other objectives and advantages can now be achieved as described herein. The disclosed embodiments describe a new method and system for significantly reducing the required footprint of SNoW-based classifiers via optimization of the classifier features. This compression technique involves two training cycles. The first proceeds normally and the classifier weights from this cycle are used to rank the Successive Mean Quantization Transform (SMQT) features using several criteria. The top N (out of 512 features) are then chosen and the training cycle is repeated using only the top N features. It has been found that OCR accuracy is maintained using only 60 out of 512 features leading to an 88% reduction in RAM utilization at runtime. This coupled with a packing of the weights from doubles to single byte integers added a further 8× reduction in RAM footprint or a reduction of 68× over the baseline SNoW method using SMQT features.

DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Automated license plate recognition (ALPR) is a key technology in the transportation business. A fundamental capability within most ALPR systems is that of optical character recognition (OCR). While OCR is a well known problem, the task of recognizing characters on a license plate is particularly difficult due to a number of challenging noise sources, including: highly non-uniform backgrounds, touching or partially occluding objects (e.g., license plate frames), excessive shadows, and generally poor image contrast. The Successive Mean Quantization Transform (SMQT) is used to produce features that are robust to many of the above noise sources. Details regarding the utilization of SMQT as part of an OCR solution were covered in U.S. patent application Ser. No. 13/352,554, which was filed on Jan. 18, 2012 and is incorporated herein by reference in its entirety.

Figure 1:
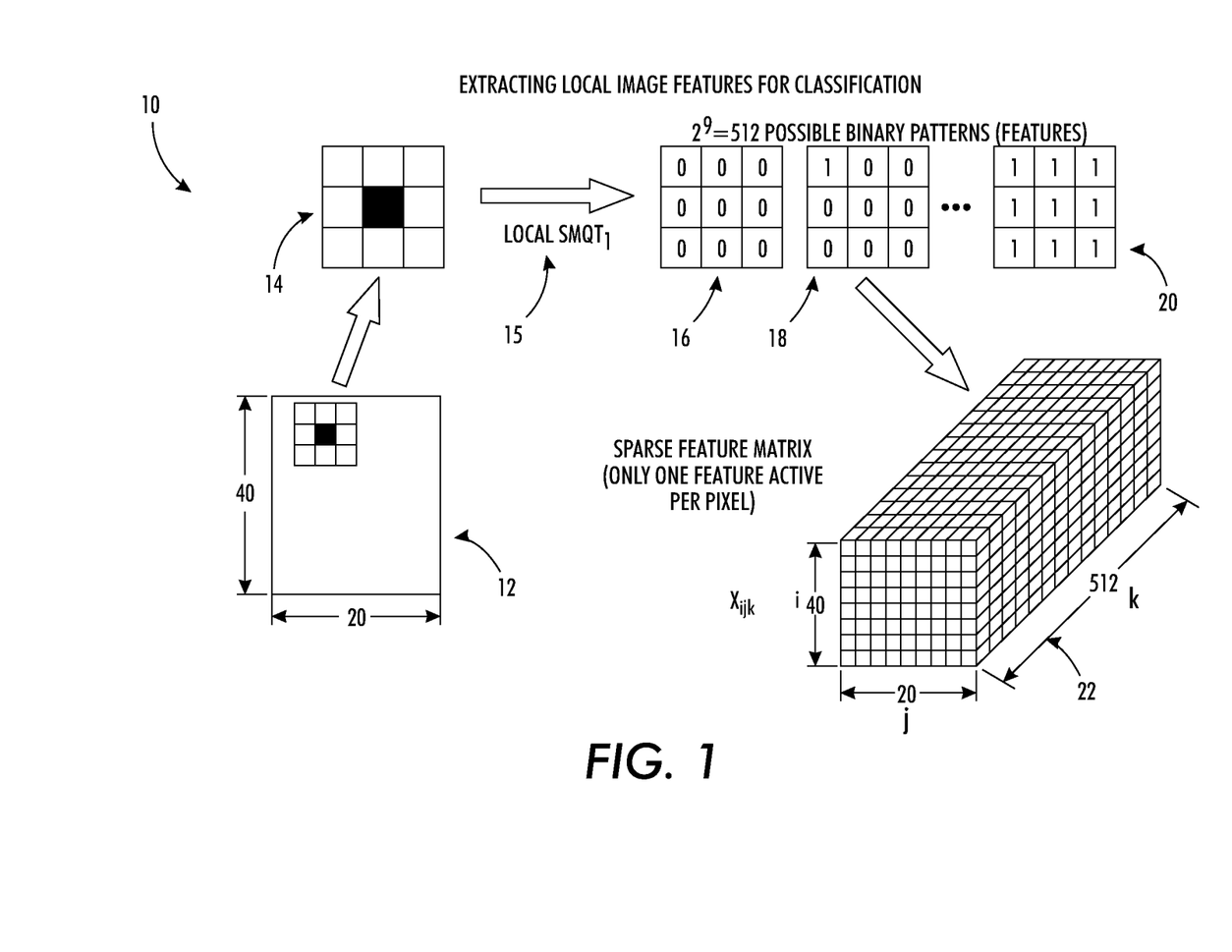
FIG. 1 illustrates a schematic overview of a SMQT representation.

FIG. 1 illustrates a schematic overview of a SMQT representation 10. In general, FIG. 1 indicates the extraction of local image features for classification with respect to blocks 12, 14, 16, 18, and 20. A local $SMQT_1$ operation is indicated by arrow 15. A one level 3×3 SMQT transform can produce as many as 512 ($2^9$) unique features depending on the intensity values of the local 3×3 image neighborhood (see FIG. 1), as represented by blocks 16, 18, and 20. As part of the OCR process, all character images are resized to a nominal site of H×W pixels. For each pixel location, weights are assigned to each of the 512 features as part of the SNoW classifier training process. During the recognition phase, only one feature is active at each pixel location based on the SMQT bit pattern in the local 3×3 neighborhood. The sum of all of these "active" weights across all the pixels in the image is then used to determine the resultant class label for the test image. A sparse feature matrix (i.e., only one feature active per pixel) is indicated by the three-dimensional representation 22 in FIG. 1.

The output of the training process is 36 (26 characters, 10 digits) 3-dimensional matrices of dimensions H×W×512. The weights are doubles nominally taking up 8 bytes per location. Each jurisdiction or state with a unique font requires its own set of OCR classifiers. This leads to the memory utilization shown in Table 1. The memory utilization both on disk and during runtime in RAM is reasonable for an OCR engine with 1 font, but quickly becomes a problem as the number of fonts increases. Since the desired state of the transportation market is to eventually have a solution that addresses all 50 U.S. states, memory utilization is clearly a challenge. This is only exacerbated if the throughput requirements dictate that the user must run multiple instances of the OCR engine, one per CPU for instance where systems today are supporting 4-12 cores nominally.

TABLE 1

OCR Memory Utilization

|  | Size on Disk (MB) | Size in RAM (MB) |
| --- | --- | --- |
| Competitor | 2 | ?? |
| BATA (1 State) | 36 | 118 |
| MTA (7 States) | 153 | 793 |
| 50 States | 1071 | 5551 |

The classifier training process manipulates the weights of the 3D matrix until all of the characters in training are correctly categorized. Clearly not all of the SMQT features will carry the same level of importance for helping the classifier discriminate between classes. The proposed method for compressing the size of the SNoW classifiers is to identify the important features. Here, a "feature" corresponds to one H×W plane of the H×W×512 matrix of weights. By analyzing the 3D classifier matrix after training we can determine the relative importance of the 512 features across all spatial locations. The ranking of features can be done using several criteria:

1. Count of non-zero weights for the particular feature plane (the preferred embodiment).
2. Mean\Median value of weights for the feature plane.
3. Highest weight feature planes for pixel locations with most non-zero weights.

The ranking of features can be custom to each character classifier in the OCR engine, or the analysis can be carried across all 36 classifiers to determine a globally optimal set of features. The latter is preferable due to a single mapping from the 512 SMQT features down to the reduced set for any character versus 36 different mappings, one for each character input.

Figure 2:
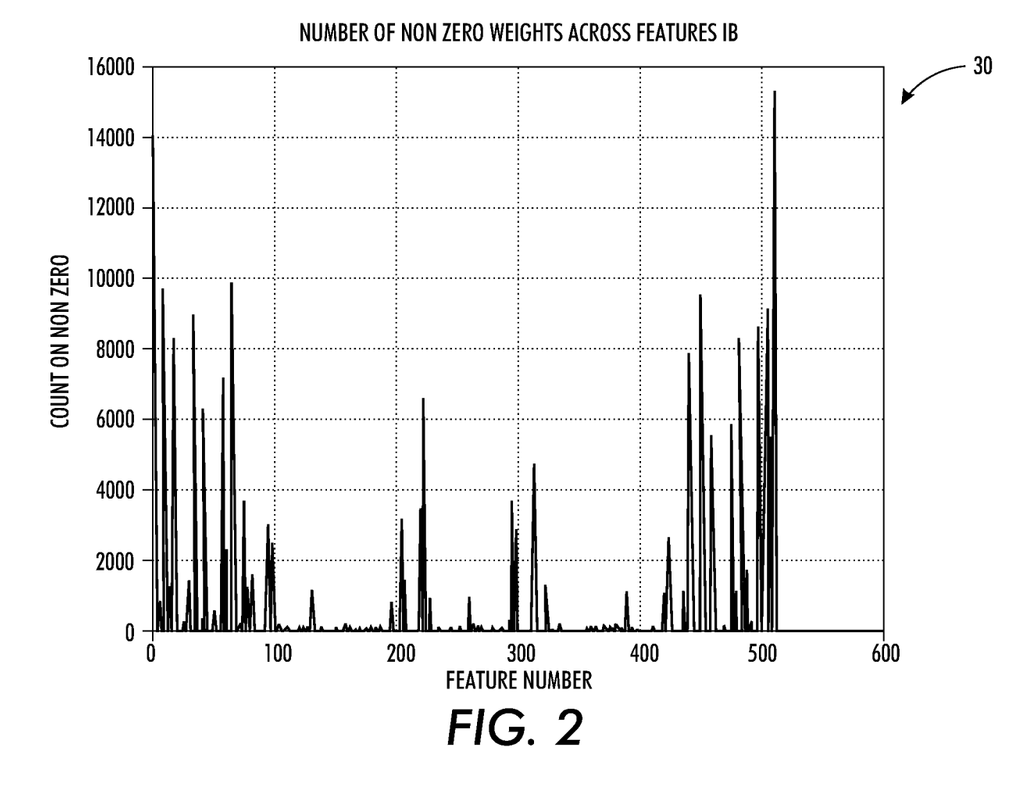
FIG. 2 illustrates a graph depicting data indicative of the relative importance of SMQT features.
Figure 3:
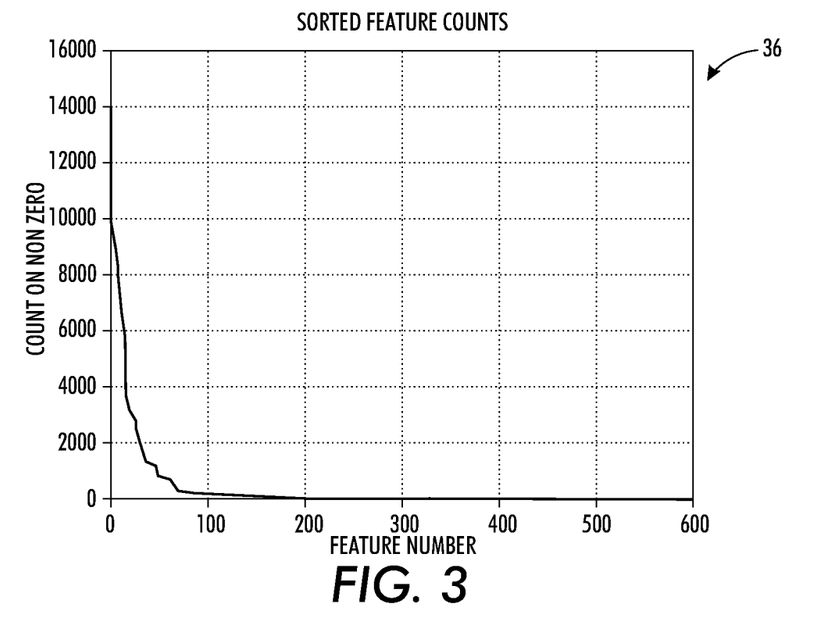
FIG. 3 illustrates a graph depicting data indicative of the sorted relative importance of SMQT features.
Figure 4:
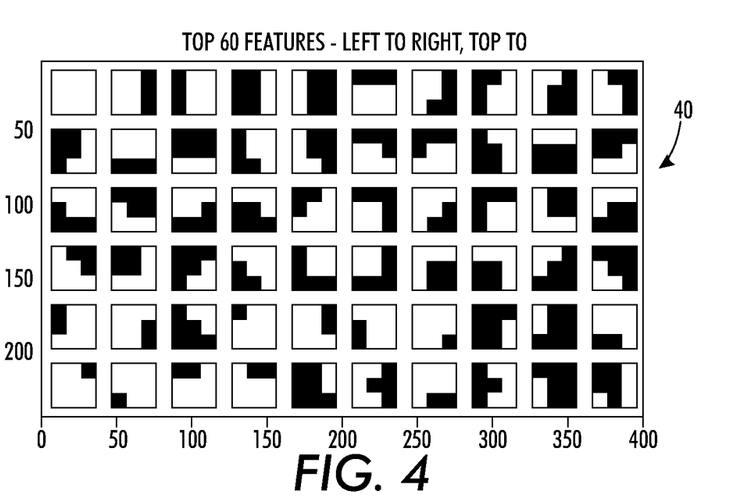
FIG. 4 illustrates a graph depicting a visualization of the 60 most important features.
Figure 5:
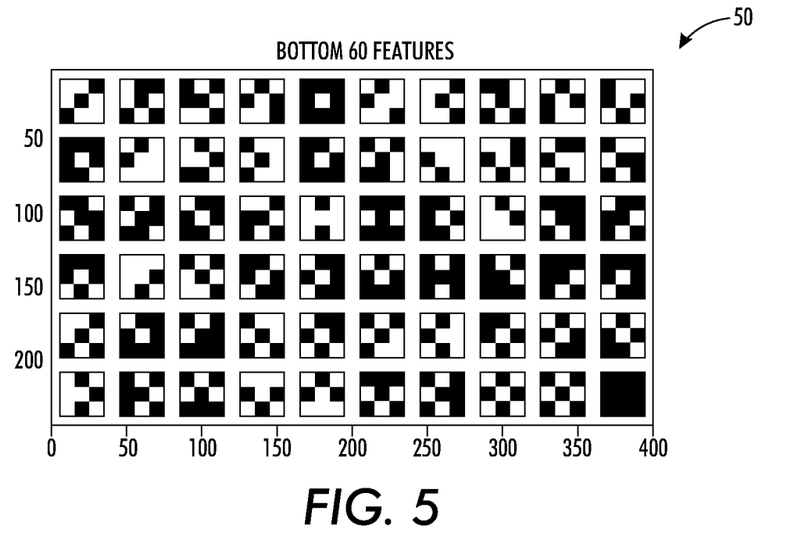
FIG. 5 illustrates a graph depicting a visualization of the 60 least important features.

FIGS. 2-3 illustrate the results via respective graphs 30, 36 of the analysis on a trained set of 36 classifiers. FIG. 4 illustrates a visualization 40 of the 60 most important features. FIG. 5, on the other hand, illustrates a visualization 50 of the 60 least important features. Sorting the features by the number of non-zero weights shows that most of the weights are concentrated in 60 top features (e.g., see FIG. 4) with the other features not playing a significant role in the classification process. This distribution changes depending on font and number of images used as part of training, but in practice the sharp drop-off is consistently observed.

Once the top N features are identified, all other features are mapped to the least important feature (feature #1 which is all dark in FIG. 5). Thus, when a test sample is analyzed, only the reduced feature set will be used to determine the classifier score and resultant label. In a preferred embodiment, the training process is repeated using only the reduced set of features. This second round of training allows the classifiers to fine tune their ability to discriminate between classes based only on the information contained in the reduced feature set. Given the constraint that training is not complete until all images are correctly classified, completion of training in a reasonable number of epochs (comparable to number of epochs when using all features) also provides an indication that the features selected are indeed the most relevant (or at least in some sense "sufficient") for classification.

Note that this multi-stage training approach could be used in a "bootstrap and refine" mode of deployment. More specifically, based on an initial (limited) pool of training examples the OCR classifiers could be trained on the full feature set. This OCR engine could then be deployed in a production setting with more limited throughput (since memory management issues would prevent spawning parallel versions of the recognition engine due to its larger footprint). As more production images were available, the reduced feature set could be more accurately identified and an additional round of training implemented.

This would then enable a significant reduction in the footprint of the engine in the field, and therefore allow more parallelization to improve throughput. Thus, both the speed and accuracy of the recognition system could improve over time as more samples were acquired and further training was performed. This is in contrast to most automated recognition systems where additional training in-the-field typically only results in accuracy improvements.

FIGS. 4 and 5 thus provide insight into the ranking of the SMQT features through visualization. We can clearly see that edge features such as horizontal, vertical, diagonal, and corners across light/dark and dark/light transitions are most important for OCR. Features representing image noise are least relevant. By excluding the less relevant features, we force the training process to emphasize the most important differentiators between characters instead of allowing diffusion and convergence by manipulating weights of noise features.

By analyzing the distribution of weights for the most important features, we learned that double precision was not required and added logic to map the double weights to single byte int8. This leads to further reduction of memory footprint without significant impact on performance.

Figure 6:
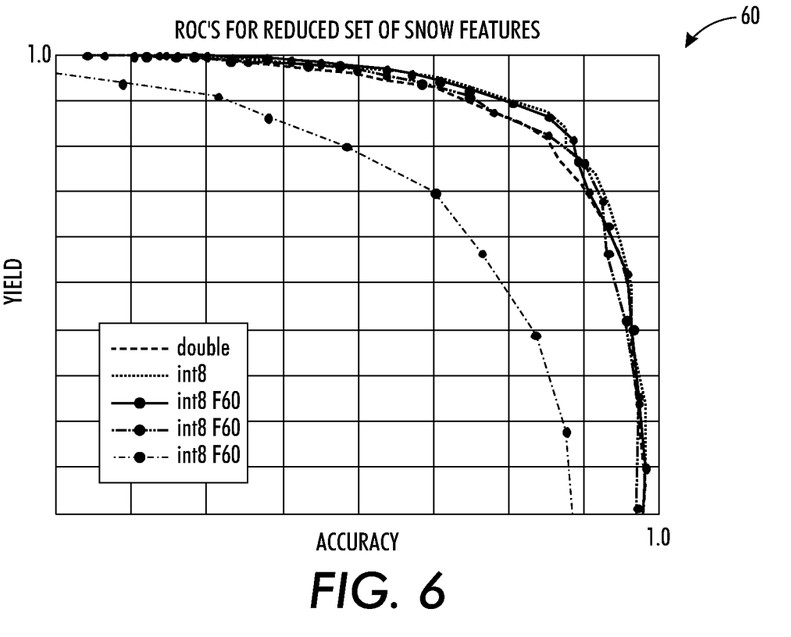
FIG. 6 illustrates a graph depicting data indicative of yield versus accuracy results and comparisons.

FIG. 6 illustrates a graph 60 plotting data comparing yield versus accuracy results. Keeping the training and test sets the same, results of testing the various classifiers are thus depicted in graph 60 of FIG. 6. In one experimental embodiment, the method discussed herein was repeated using 20, 30, and 60 top features. In all cases, there is a slight performance improvement when using the proposed method over the baseline double (red curve). Most importantly, the reduction in memory footprint (seen in Table 2) provides flexibility and cost savings as the hardware requirements are greatly reduced. The execution time of the OCR engine is also improved since less memory needs to be shuffled around.

|  | Size on Disk (MB) | Size in RAM (MB) |
| --- | --- | --- |
| BATA (1 State) | 36 | 118 |
| BATA with compressed features | 1.6 | 1.7 |
| MTA (7 States) | 153 | 793 |
| MTA with compressed features | 8 | 11.6 |

Figure 7:
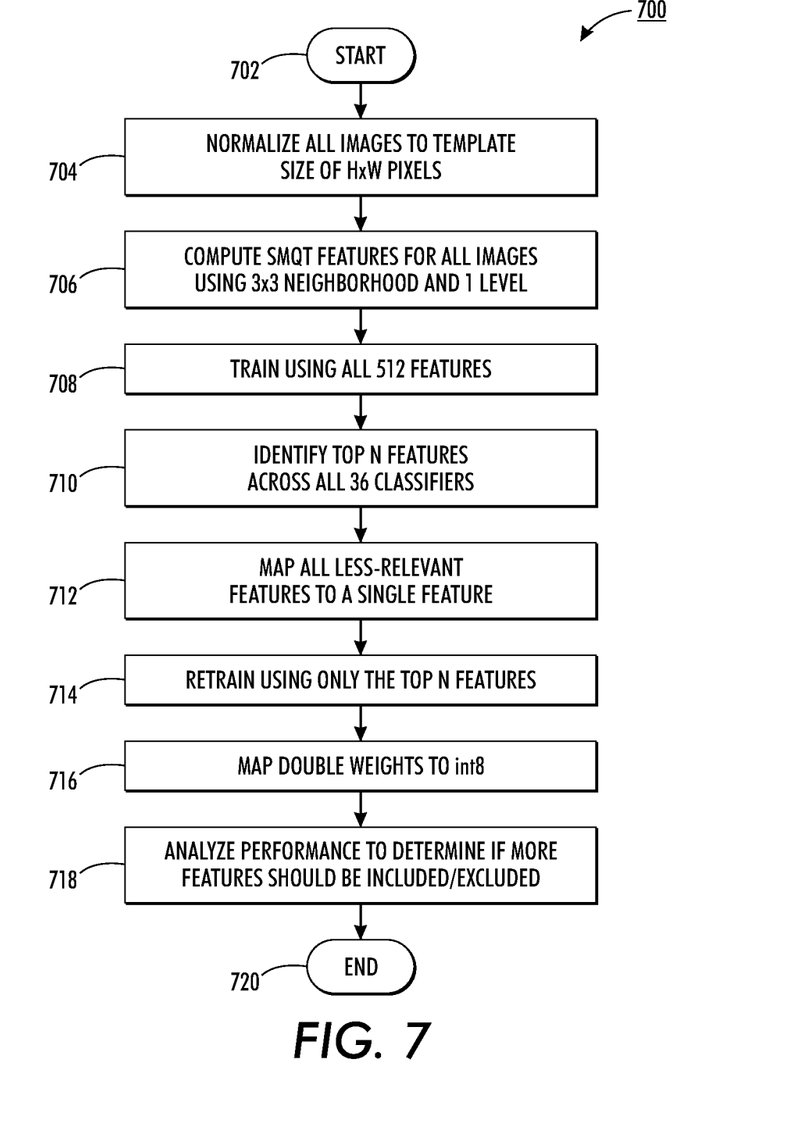
FIG. 7 illustrates a block diagram of a data-processing system that may be utilized to implement one or more embodiments.

FIG. 7 illustrates a high-level flow chart of operations depicting logical operations of a classifier method 700, in accordance with the disclosed embodiments. In general, the process begins, as indicated at block 702. Thereafter, as depicted at block 704, a step or logical operation can be implemented to normalize all images to template size of H×W pixels. Following processing of the operation indicated at block 704, an operation can be processed to compute SMQT features for all images using 3×3 neighborhood and 1 level, as shown at block 706. Then, as depicted at block 708, an operation can be implemented to train using all 512 features. Thereafter, as described at block 710, an operation can be implemented or processed to identify top N features across all 36 classifiers.

Next, as indicated at block 712, all less-relevant features can be mapped to a single feature. Thereafter as depicted at block 714, an operation can be implemented to retrain using only the top N features. Next, as illustrated at block 716, an operation can be implemented to map double weights to int8. Following processing of the operation indicated at block 716, an operation can be implemented to analyze the performance to determine if more features should be included/excluded. The process can then terminate, as shown at block 720.

As will be appreciated by one skilled in the art, the disclosed embodiments can be implemented as a method, data-processing system, or computer program product. For example, the process flow or method described above can be implemented in the context of a data-processing system, computer program, processor-readable media, etc. Accordingly, the embodiments may take the form of an entire hardware implementation, an entire software embodiment or an embodiment combining software and hardware aspects all generally referred to as a "circuit" or "module". Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified with respect to, for example, the various instructions of the process/flow or method described above.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in, for example, a block or blocks of a process flow diagram or flow chart of logical operations.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
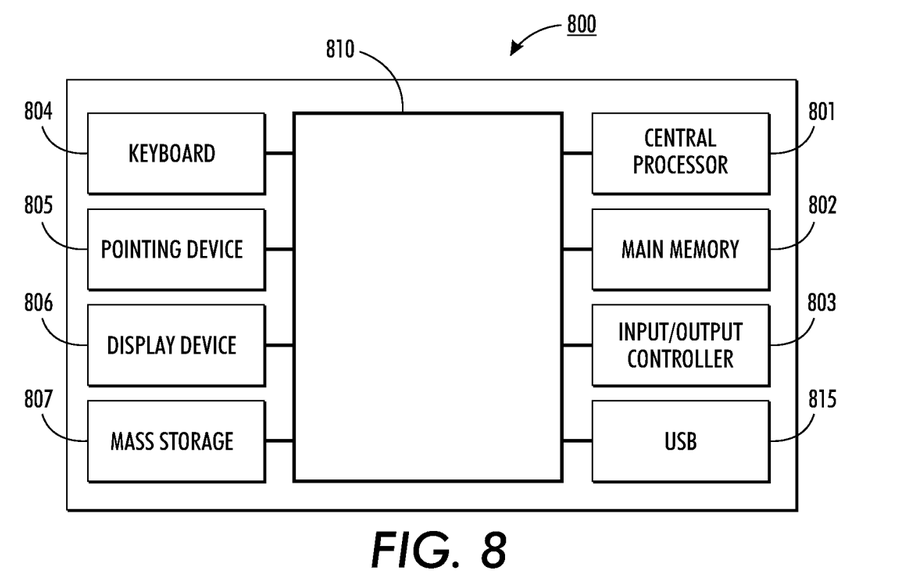
FIG. 8 illustrates a computer software system for directing the operation of the data-processing system depicted in FIG. 7, in accordance with an example embodiment.
Figure 9:
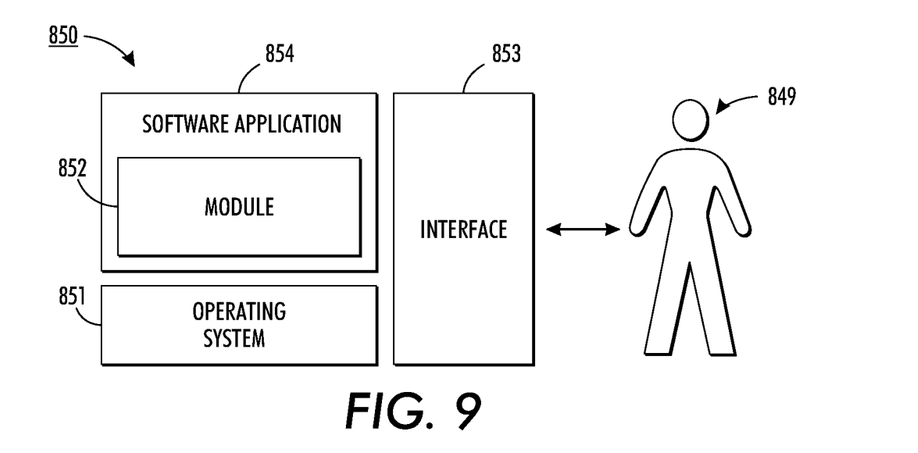
FIG. 9 illustrates a computer software system, which may be employed for directing the operation of the data-processing system depicted in FIG. 8, in accordance with an example embodiment.

FIGS. 8-9 are provided as exemplary diagrams of data-processing environments in which embodiments of the present invention may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 8, the disclosed embodiments may be implemented in the context of a data-processing system 800 that includes, for example, a central processor 801 (or other processors), a main memory 802, an input/output controller 803, and in some embodiments, a USB (Universal Serial Bus) 815 or other appropriate peripheral connection. System 800 can also include a keyboard 804, an input device 805 (e.g., a pointing device such as a mouse, track ball, pen device, etc.), a display device 806, and a mass storage 807 (e.g., a hard disk). As illustrated, the various components of data-processing system 800 can communicate electronically through a system bus 810 or similar architecture. The system bus 810 may be, for example, a subsystem that transfers data between, for example, computer components within data-processing system 800 or to and from other data-processing devices, components, computers, etc.

FIG. 9 illustrates a computer software system 850, which may be employed for directing the operation of the data-processing system 800 depicted in FIG. 8. In general, computer software system 850 can include an interface 853, an operating system 851, a software application 854, and one or more modules such as module 852. Software application 854, stored in main memory 802 and on mass storage 807 shown in FIG. 9, generally includes and/or is associated with a kernel or operating system 851 and a shell or interface 853. One or more application programs, such as module(s) 852, may be "loaded" (i.e., transferred from mass storage 807 into the main memory 802) for execution by the data-processing system 800. The data-processing system 800 can receive user commands and data through user interface 853 accessible by a user 849. These inputs may then be acted upon by the data-processing system 800 in accordance with instructions from operating system 851 and/or software application 854 and any software module(s) 852 thereof.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 852) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 853 (e.g., a graphical user interface) can serve to display results, whereupon a user may supply additional inputs or terminate a particular session. In some embodiments, operating system 851 and interface 853 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 851 and interface 853. The software application 854 can include, for example, module(s) 852, which can include instructions for carrying out steps or logical operations such as those described herein, for example, with respect to the process flow above.

FIGS. 8-9 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Mac, Microsoft OS, UNIX, LINUX, etc.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for reducing the required footprints associated with classifiers, said method comprising:
    employing classifier weights associated with SNoW classifiers from a SNoW classifier training cycle to rank utilizing particular criteria features comprising SMQT features;
    selecting at least one top feature among said SMQT features;
    repeating said SNoW classifier training cycle using only said at least one top feature in order to thereafter determine if additional features among said SMQT features should be included or excluded to reduce said footprints associated with said SNoW classifiers; and wherein a size of said SNoW classifiers is compressed in order to identify important features among said features and wherein for each pixel location said classifier weights are assigned to each of said features as part of said SNoW classifier training cycle and wherein during a recognition phase only feature among said features is active at said each pixel location based on an SMQT bit pattern in a location neighborhood and wherein a sum of active classifier weights among said classifier weights is employed to determine a resultant class label for a test image.

2. The method of claim 1 wherein said classifier weights are contained in a 3D classifier matrix and wherein said classifier training cycle manipulates said classifier weights of said 3D matrix so that all characters in training are correctly categorized.

3. The method of claim 1 further comprising:
    analyzing a 3D classifier matrix associated with said classifiers to determine a relative importance of said features across all spatial locations; and
    ranking said features by employing said particular criteria comprising at least one of all of the following:
        a count of non-zero weights with respect to said feature, said feature comprising at least a particular feature plane;
        a mean/median value of weights associated with a feature plane of said feature; and
        a highest weight feature plane associated with said feature with respect to at least one pixel location with a highest value of non-zero weight.

4. The method of claim 1 further comprising ranking said features by employing said particular criteria, wherein said ranking of said features is custom to each character classifier in an OCR engine or said ranking is carried across all of said classifiers to determine a globally optimal set of features.

5. The method of claim 4 wherein said particular criteria comprises a count of non-zero weights with respect to said feature, said feature comprising at least a particular feature plane.

6. The method of claim 5 wherein said particular criteria further comprises a mean/median value of weights associated with a feature plane of said feature.

7. The method of claim 5 wherein said particular criteria further comprises a highest weight feature plane associated with said feature with respect to at least one pixel location with a highest value of non-zero weight.

8. A system for reducing the required footprints associated with classifiers, said system comprising:
    a processor;
    a data bus coupled to said processor;
    a non-transitory computer-usable medium embodying computer program code, said computer-usable medium being coupled to said data bus, said computer program code comprising instructions executable by said processor and configured for:
    employing classifier weights associated with SNoW classifiers from a SNoW training cycle to rank utilizing particular criteria features comprising SMQT features;
    selecting at least one top feature among said SMQT features;
    repeating said SNoW classifier training cycle using only said at least one top feature among said SMQT features in order to thereafter determine if additional features among said SMQT features should be included or excluded to reduce said footprints associated with said SNoW classifiers; and
    wherein a size of said SNoW classifiers is compressed in order to identify important features among said features and wherein for each pixel location said classifier weights are assigned to each of said features as part of said SNoW classifier training cycle and wherein during a recognition phase only feature among said features is active at said each pixel location based on an SMQT bit pattern in a location neighborhood and wherein a sum of active classifier weights among said classifier weights is employed to determine a resultant class label for a test image.

9. The system of claim 8 wherein said classifier weights are contained in a 3D classifier matrix and wherein said classifier training cycle manipulates said classifier weights of said 3D matrix so that all characters in training are correctly categorized.

10. The system of claim 8 wherein said instructions are further configured for:
    analyzing a 3D classifier matrix associated with said classifiers to determine a relative importance of said features across all spatial locations; and
    ranking said features by employing said particular criteria comprising at least one of all the following:
        a count of non-zero weights with respect to said feature, said feature comprising at least a particular feature plane;
        a mean/median value of weights associated with a feature plane of said features; and
        a highest weight feature plane associated with said feature with respect to at least one pixel location with a highest value of non-zero weight.

11. The system of claim 9 wherein for each pixel location said classifier weights are assigned to each of said features as part of said SNoW classifier training cycle.

12. The system of claim 9 wherein a size of said SNoW classifiers is compressed in order to identify important features among said features.

13. The system of claim 11 wherein during a recognition phase only feature among said features is active at said each pixel location based on an SMQT bit pattern in a location neighborhood.

14. The system of claim 11 wherein a sum of active classifier weights among said classifier weights is employed to determine a resultant class label for a test image.

15. A non-transitory processor-readable medium storing code representing instructions to cause a process for reducing the required footprints associated with classifiers, said code comprising code to:

employ classifier weights associated with SNoW classifiers from a SNoW classifier training cycle to rank utilizing particular features comprising SMQT features;

select at least one top feature among said features;

repeat said SNoW classifier training cycle using only said at least one top feature in order to thereafter determine if additional features among said features should be included or excluded to reduce said footprints associated with said classifiers; and wherein a size of said SNoW classifiers is compressed in order to identify important features among said features and wherein for each pixel location said classifier weights are assigned to each of said features as part of said SNoW classifier training cycle and wherein during a recognition phase only feature among said features is active at said each pixel location based on an SMQT bit pattern in a location neighborhood and wherein a sum of active classifier weights among said classifier weights is employed to determine a resultant class label for a test image.

16. The non-transitory processor-readable medium of claim 15 wherein said classifier weights are contained in a 3D classifier matrix and wherein said classifier training cycle manipulates said classifier weights of said 3D matrix so that all characters in training are correctly categorized.

17. The non-transitory processor-readable medium of claim 15 wherein said code further comprises code to:

analyze a 3D classifier matrix associated with said SNoW classifiers to determine a relative importance of said features across spatial locations; and rank said features by employing said particular criteria comprising at least one of all of the following:

a count of non-zero weights with respect to said feature, said feature comprising at least a particular feature plane;

a mean/median value of weights associated with a feature plane of said feature; and a highest weight feature plane associated with said feature with respect to at least one pixel location with a highest value of non-zero weight.

* * * * *